(12) United States Patent
Kodama et al.

(10) Patent No.: US 7,745,968 B2
(45) Date of Patent: Jun. 29, 2010

(54) MOTOR AND DISC DRIVE WITH MOTOR

(75) Inventors: Mitsuo Kodama, Shizuoka-ken (JP);
Takuji Yamada, Shizuoka-ken (JP);
Matomo Nagaoka, Shizuoka-ken (JP)

(73) Assignee: Alphana Technology Co., Ltd., Fujieda-shi (JP)

( * ) Notice: Subject to any disclaimer, the term of this patent is extended or adjusted under 35 U.S.C. 154(b) by 392 days.

(21) Appl. No.: 11/896,944

(22) Filed: Sep. 6, 2007

(65) Prior Publication Data
US 2008/0061646 A1 Mar. 13, 2008

(30) Foreign Application Priority Data
Sep. 7, 2006 (JP) ............... 2006-242286

(51) Int. Cl.
*H02K 7/08* (2006.01)
(52) U.S. Cl. ...................... 310/90; 310/67 R
(58) Field of Classification Search .............. 310/67 R, 310/90; 360/99.08
See application file for complete search history.

(56) References Cited
U.S. PATENT DOCUMENTS

| | | | | |
|---|---|---|---|---|
| 4,783,608 A | * | 11/1988 | Gruber et al. ............. | 310/90 |
| 5,806,987 A | * | 9/1998 | Nose et al. ............... | 384/100 |
| 6,118,198 A | * | 9/2000 | Hollenbeck et al. ....... | 310/89 |
| 6,307,291 B1 | * | 10/2001 | Iwaki et al. .............. | 310/90 |
| 6,900,567 B2 | * | 5/2005 | Aiello et al. ............. | 310/90 |
| 2006/0170300 A1 | * | 8/2006 | Kodama .................. | 310/90 |
| 2006/0171615 A1 | * | 8/2006 | Kodama .................. | 384/100 |

FOREIGN PATENT DOCUMENTS

| JP | 2004-328926 | 11/2004 |
|---|---|---|
| JP | 2006-183734 | 7/2006 |

* cited by examiner

*Primary Examiner*—Quyen Leung
*Assistant Examiner*—Naishadh N Desai
(74) *Attorney, Agent, or Firm*—The Nath Law Group; Jerald L. Meyer; Sungyeop Chung

(57) ABSTRACT

A motor includes a sleeve, a sleeve holder, a rotor hub and an inner body. The sleeve has a flange portion on an outer circumference portion thereof. The sleeve holder holds the sleeve. The rotor hub has an annular wall portion. The inner body is fixed in an inside of the annular wall portion so as to surround the sleeve and the sleeve holder. The inner body has an annular protrusion portion which is sandwiched between the flange portion and one end portion of the sleeve holder on an inner circumference portion of thereof. A first thrust bearing portion in which a lubrication agent is filled is formed between the annular protrusion portion and the flange portion. A second thrust bearing portion in which the lubrication agent is filled is formed between the annular protrusion portion and the one end portion of the sleeve holder.

7 Claims, 3 Drawing Sheets

MOTOR AND DISC DRIVE WITH MOTOR

BACKGROUND OF THE INVENTION

1. Field of the Invention

The present invention relates to a motor employed in a disc drive such as a hard disc drive (HDD), as a drive source of the disc drive for driving a disc such as a compact disc (CD), a compact disc read only memory (CD-ROM) or a digital versatile disc (DVD).

2. Description of the Related Art

Recently, there is a spindle motor with a fluid dynamic bearing in a dynamic pressure type as a rotary drive source for a disc which is an information record medium. The spindle motor is configured to firmly attach a sleeve on a motor base which forms a stator and to fill lubrication oil in a gap between the sleeve and a rotary shaft. The spindle motor has the following advantageous features: (1) the load facility is large; and (2) the high-speed capability is excellent.

A bearing structure of the spindle motor is disclosed in Japanese Patent Application Laid-Open No. 2004-328926. In the bearing structure, a thrust bearing portion where a dynamic pressure is to be generated is provided between the sleeve and a rotor hub, and a retaining mechanism for a rotor is provided by forming a flange portion on an outer circumference of the sleeve. However, even if the thrust load is supported at the thrust bearing portion, there is a problem that the bearing structure is weak with respect to thrust force acting in a direction in which the rotor comes out of the spindle motor because force acting against the direction in which the rotor comes out of the spindle motor is only magnetic force of a magnet.

In order to resolve the above problem, another bearing structure is disclosed in Japanese Patent Application Laid-Open No. 2006-183734. In the bearing structure, two thrust bearing portions are provided to support thrust load which is generated by a dynamic pressure at the two thrust bearing portions and acts in two directions along an axial direction.

As shown in FIG. 1, a rotor hub Rh is formed in a cupped shape. The rotor hub Rh has an annular wall portion W at an outer periphery portion thereof and a center portion Rs1 at a center portion thereof. A rotor spindle Rs is composed of the center portion Rs1 and an outer cylinder portion Rs2. The center portion Rs1 is integrally formed in the rotor hub Rh. The outer cylinder portion Rs2 is fitted to an outer periphery portion of the center portion Rs1. A sleeve S supports the rotor spindle Rs and has a flange portion f at one end side of an outer periphery portion thereof. A seal ring Sr is fixed at the other end side of the outer periphery portion of the sleeve S. A thrust ring Tr is inserted between the flange portion f and the seal ring Sr. The thrust ring Tr is fixed in the annular wall portion W and abuts on a step portion of the annular wall portion W at an outer periphery portion thereof. In the rotor hub Rh, lubrication oil is filled in gaps between the flange portion f and the annular wall portion W, between the flange portion f and the thrust ring Tr, between the sleeve S and the thrust ring Tr, between the thrust ring Tr and the seal ring Sr, and between the seal ring Sr and the annular wall portion W. A taper seal portion Ts is formed at a gap between the seal ring Sr and the annular wall portion W to prevent the lubrication oil from leaking outside. Thrust bearing portions TB and TB each where a dynamic pressure of the lubrication oil is to be generated are formed between the flange portion f and the thrust ring Tr and between the seal ring Sr and the thrust ring Tr, respectively.

In the above-described bearing structure, it is preferred that the taper seal portion Ts is located in the vicinity of a center area of the bearing structure. In this configuration, even if the lubrication oil spreads outside due to centrifugal force, it is not likely that the spreading lubrication oil arrives at an outside of the rotor hub Rh. This provides a large space for motor drive members such as a field magnet Mg and a drive coil C to be disposed in the outside of the rotor hub Rh, in the bearing structure.

However, in reality, it is impossible to locate the taper seal portion Ts in the vicinity of the center area of the bearing structure because the taper seal portion Ts should be disposed in an outside of the flange portion f due to the bearing structure. In a case where an engineer wants to force the taper seal portion Ts to be located in the vicinity of the center area of the bearing structure, lengths of the thrust bearing portions TB and TB should be reduced as sacrificing characters of the thrust bearing portions TB and TB.

The above-described bearing structure also requires high impact resistance. However, the thrust ring Tr is flattened in shape and pressure-inserted into a part of the annular wall portion W to be held only at the outer periphery portion thereof. This can not provide the bearing structure sufficient pressure-insertion intensity. If external force acts against the rotor spindle Rs in a direction (upper direction in FIG. 1) where the rotor spindle Rs moves away from the sleeve S, it is likely that the external force misaligns a relative position between the rotor hub Rh and the thrust ring Tr.

When the above-described bearing structure is assembled, the sleeve S is loosely fitted to an inner hole of the thrust ring Tr and then pressure-inserted into an inner hole of the seal ring Sr. Then, this assembled bearing unit is pressure-inserted into the annular wall portion W. At this time, the assembled bearing unit is pressure-inserted by pressing the seal ring Sr against the annular wall portion W. In this process, it is likely that each thrust bearing portion TB is flattened out. If the thrust bearing portion TB is flattened out, the bearing structure can not obtain dynamic pressure requirement.

In a case where the field magnet Mg is fixed to the bearing structure and the drive coil C is disposed at a stator side which is an outside of the field magnet Mg, one or more members located in an inner hole of the field magnet Mg needs to be made of a magnetic material in order to form a magnetic circuit in the inner hole. In the above-described bearing structure, the whole of rotor hub Rh is made of a magnetic material because the annular wall portion W is located in the inner hole of the field magnet Mg. This reduces drive torque to be generated in the drive coil C because a part of magnetic fluxes is introduced into a rotor spindle Rs side to reduce magnetic flux acting at a drive coil C side.

SUMMARY OF THE INVENTION

The present invention has an object to provide a small motor with high impact resistance and high rotation capacity and a disc drive with the motor.

In order to achieve the above object, the present invention provides a motor (M, M') comprising: a sleeve (3) having a flange portion (3B) on an outer circumference portion thereof and configured to rotatably support a rotor spindle (5); a sleeve holder (2) configured to hold the sleeve (3); a rotor hub (6, 106) having an annular wall portion (6A, 106A1) which has the same center axis as the rotor spindle (5) and configured to rotate together with the rotor spindle (5); and an inner body (8) fixed in an inside of the annular wall portion (6A, 106A1) so as to surround the sleeve (3) and the sleeve holder (2), wherein the inner body (8) has a first end portion (8f) which abuts to an inner surface (6Bf) of the rotor hub (6, 106) and has an annular protrusion portion (8A) which is sandwiched between the flange portion (3B) and one end portion of the sleeve holder (2), on an inner circumference portion of thereof, wherein a first thrust bearing portion (TB1) in which a lubrication agent is filled is formed between the annular protrusion portion (8A) and the flange portion (3B) and a second thrust bearing portion (TB2) in which the lubrication agent is filled is formed between the annular protrusion portion (8A) and the one end portion of the sleeve holder (2).

In a preferred embodiment of the present invention, the inner body (8) has a second end portion (8B) which protrudes from the annular wall portion (6A) and a field magnet (10) is fixed to an outer circumference surface of the second end portion (8B).

In a preferred embodiment of the present invention, the inner body (8) and the rotor hub (6) are made of a magnetic material and a non-magnetic material, respectively.

In a preferred embodiment of the present invention, the rotor hub (106) has a second annular wall portion (106A2) outside the annular wall portion (106A1) and a field magnet (110) is fixed to an inner circumference surface of the second annular wall portion (106A2).

In a preferred embodiment of the present invention, the inner body (8) and the rotor hub (106) are made of a non-magnetic material and a magnetic material, respectively.

In order to achieve the above object, the present invention provides a disc drive comprising: a housing (20); and a motor (M, M') built into the housing (20), wherein the motor (M, M') comprising: a sleeve (3) having a flange portion (3B) on an outer circumference portion thereof and configured to rotatably support a rotor spindle (5); a sleeve holder (2) configured to hold the sleeve (3); a rotor hub (6, 106) having an annular wall portion (6A, 106A1) which has the same center axis as the rotor spindle (5) and configured to rotate together with the rotor spindle (5); and an inner body (8) fixed in an inside of the annular wall portion (6A, 106A1) so as to surround the sleeve (3) and the sleeve holder (2), wherein the inner body (8) has a first end portion (8f) which abuts to an inner surface (6Bf) of the rotor hub (6, 106) and has an annular protrusion portion (8A) which is sandwiched between the flange portion (3B) and one end portion of the sleeve holder (2), on an inner circumference portion of thereof, wherein a first thrust bearing portion (TB1) in which a lubrication agent is filled is formed between the annular protrusion portion (8A) and the flange portion (3B) and a second thrust bearing portion (TB2) in which the lubrication agent is filled is formed between the annular protrusion portion (8A) and the one end portion of the sleeve holder (2).

According to the present invention, the sleeve and the sleeve holder are surrounded by the inner body which is fixed in the inside of the annular wall portion of the rotor hub. This allows a gap, which corresponds to a taper seal portion disclosed in Japanese Patent Application Laid-Open No. 2006-183734, to be formed by adjusting an inner diameter of the inner body and outer diameters of the sleeve and the sleeve holder, independent of an outer diameter of the flange portion of the sleeve. This configuration allows the gap to be disposed at a rotor spindle side, which prevents the lubrication oil from spreading outside due to centrifugal force.

Also, the first end portion of the inner body abuts the inner surface of the rotor hub. This allows the annular wall portion of the rotor hub to hold the inner body at a whole inner circumference surface of the annular wall portion, which increases pressure-insertion strength. Therefore, the motor has high impact resistance and reliability of the motor increases.

Further, the inner body surrounds the sleeve holder. Therefore, a bearing unit which is formed by assembling the inner body, the sleeve and the sleeve holder, can be built into the annular wall portion of the rotor hub by only pressing one end surface of the inner body toward the inside of the annular wall portion. As a result, pressure force does not directly act for the first thrust bearing portion, which is formed between the annular protrusion of the inner body and the flange portion of the sleeve, and the second thrust bearing portion, which is formed between the annular protrusion of the inner body and the one end portion of the sleeve holder, when the bearing unit is inserted into the annular wall portion. This prevents the first and second thrust bearing portions from being flattened out, deformed and/or damaged.

Furthermore, the second end portion of the inner body protrudes from the annular wall portion and the field magnet is fixed to the outer circumference surface of the second end portion. This configuration provides a large space for the field magnet and a drive coil to be disposed in the outside of the rotor hub. Also, the inner body and the rotor hub are made of a magnetic material and a non-magnetic material, respectively. This prevents magnetic fluxes from being introduced into the rotor spindle side. Therefore, drive torque to be generated in the drive coil increases because a part of magnetic fluxes is not introduced into the rotor spindle side.

DESCRIPTION OF THE PREFERRED EMBODIMENTS

First Exemplary Embodiment

A motor (electric motor) according to a first exemplary embodiment of the present invention will be described below in detail, with reference to FIGS. 2 to 4.

Figure 1:
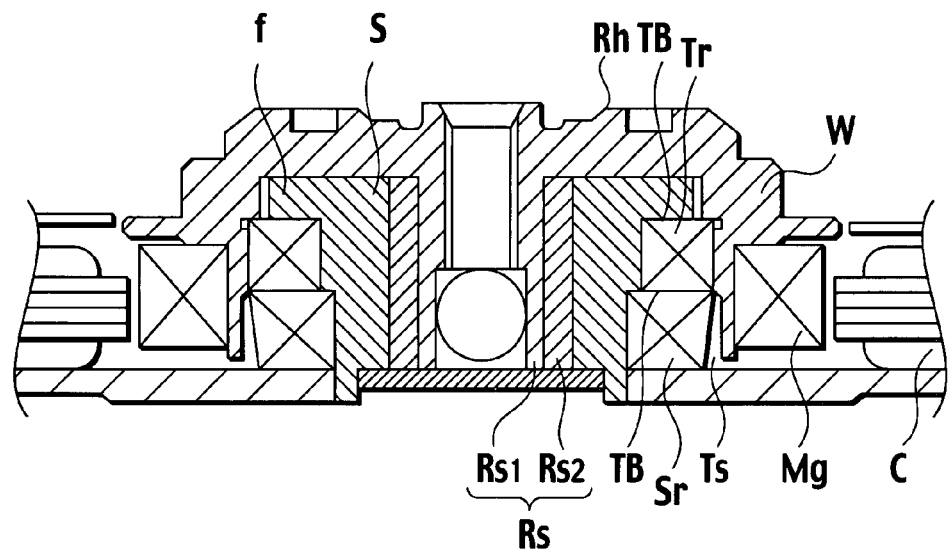
FIG. 1 is a cross-sectional view of a conventional motor.
Figure 2:
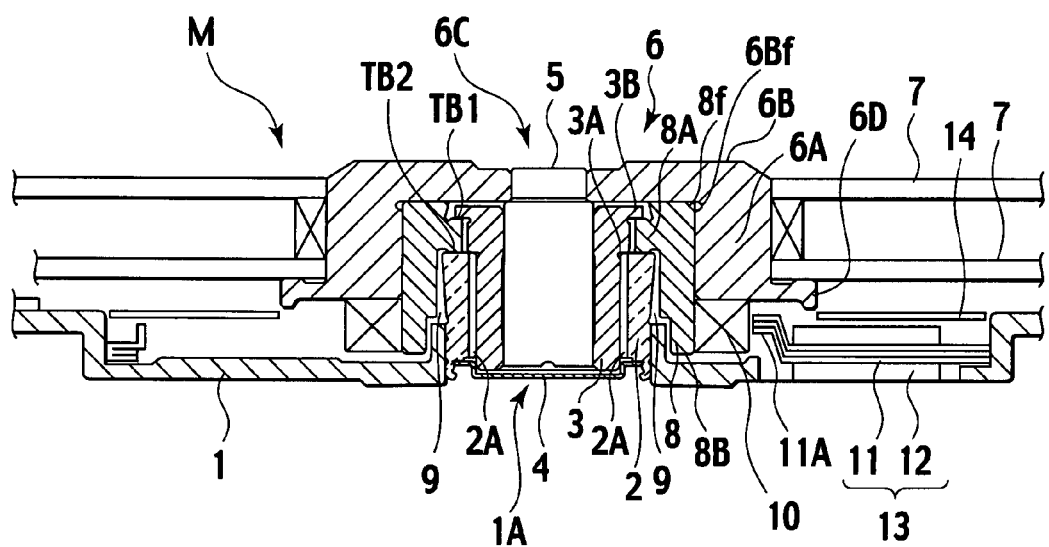
FIG. 2 is a cross-sectional view of a motor according to a first exemplary embodiment of the present invention.

As shown in FIG. 2, a motor M comprises a motor base 1, a sleeve holder 2, a sleeve 3, a seal plate 4, a rotor spindle 5, a rotor hub 6, an inner body 8, a taper seal portion 9, a field magnet 10, an armature 13 and a magnetic shield 14. The motor M is built into a disc drive (not shown in FIGS. 2 and 3) as a disc drive spindle motor configured to rotate a hard disc.

The motor base 1 forms a stator and has a center hole 1A at a center portion thereof. The motor base 1 is formed by press work for pressing an aluminum plate. The sleeve holder 2 has a cylindrical shape and an inner hole at a center portion thereof. The sleeve holder 2 is fixed into the center hole 1A with an adhesive material. The sleeve 3 has a cylindrical shape and an inner hole at a center portion thereof. The sleeve 3 is pressure-inserted into the inner hole of the sleeve holder 2 or fixed into the inner hole of the sleeve holder 2 with an adhesive material, to be fixedly held by the sleeve holder 2.

The seal plate 4 is fixed to one end of the sleeve holder 2. Thereby, one opening of the sleeve holder 2 is fully closed by the seal plate 4. The sleeve 3 has a step portion 3A at an upper portion of an outer circumference portion thereof. The step portion 3A is employed to position the sleeve 3 with respect to the sleeve holder 2. The step portion 3A is firmly attached to the other end of the sleeve holder 2. More specifically, an annular bottom surface of the step portion 3A abuts to an annular rim of the other opening of the inner hole of the sleeve holder 2.

An oil passage 2A is formed between the sleeve holder 2 and the sleeve 3. The oil passage 2A extends along axial directions of the sleeve holder 2 and the sleeve 3. A lubrication agent (lubrication oil) is poured into the oil passage 2A, which causes the lubrication agent to be filled between an inner circumference portion of the sleeve holder 2 and an lower portion of the outer circumference portion of the sleeve 3. The sleeve 3 has a flange portion 3B at a top portion of the outer circumference portion thereof. The flange portion 3B extends outward from the top portion. A bottom surface of the flange portion 3B is opposed to an upper surface of the annular rim of the other opening of the inner hole of the sleeve holder 2 at a distance.

The rotor spindle 5 is inserted into the inner hole of the sleeve 3 to be rotatably supported by the sleeve 3. The rotor hub 6 is fixed to a top portion of the rotor spindle 5 to be rotated together with the rotor spindle 5. It is noted that a rotor is composed of the rotor spindle 5 and the rotor hub 6.

The rotor hub 6 has a cup-like shape, and includes an annular wall portion 6A and a disc portion 6B. The annular wall portion 6A has a vamplate 6D at an outer circumference portion of one end thereof. The vamplate 6D extends outside from the outer circumference portion. The annular wall portion 6A has the same central axis as the rotor spindle 5. The disc portion 6B is integrally connected to the other end of the annular wall portion 6A at one end thereof. The disc portion 6B has a coupling hole 6C at a center portion thereof. The rotor spindle 5 is inserted into the inner hole of the sleeve 3 through the coupling hole 6C. The rotor hub 6 is inserted into a center hole of a disc 7 (hard disc in this embodiment), which holds the disc 7 on the vamplate 6D of the rotor hub 6.

The inner body 8 is disposed between the sleeve holder 2 and the annular wall portion 6A and between the sleeve 3 and the annular wall portion 6A. More specifically, the inner body 8 is fixed to an inner circumference portion of the annular wall portion 6A and is loosely fitted to the sleeve holder 2 and the sleeve 3. The inner body 8 has an annular protrusion portion 8A at an inner circumference portion thereof. The annular protrusion portion 8A extends intrad from the inner circumference portion and is sandwiched between the bottom surface of the flange portion 3B of the sleeve 3 and the upper surface of the annular rim of the sleeve holder 2. The lubrication agent poured into the oil passage 2A is filled in two bearing gaps between the annular protrusion portion 8A and the sleeve holder 2 and between the annular protrusion portion 8A and the flange portion 3B. Thrust bearing portions TB1 and TB2 in a dynamic pressure type have the two bearing gaps, respectively. The thrust bearing portions TB1 and TB2 support thrust loads each which is generated by a dynamic pressure at the thrust bearing portion TB1 or TB2 and acts in two directions along an axial direction of the rotor. It is noted that grooves (e.g. herringbone type groove, not shown) are respectively formed at top and bottom surfaces of the annular protrusion portion 8A, which are surfaces opposed to the bottom surface of the flange portion 3B and the upper surface of the annular rim of the sleeve holder 2. These grooves may be formed at the bottom surface of the flange portion 3B and the upper surface of the annular rim of the sleeve holder 2.

One gap between the annular protrusion portion 8A and the sleeve holder 2 communicates with a taper gap between the inner body 8 and the sleeve holder 2. The taper gap has a width which gradually increases as moving toward a motor base 1 side. A taper seal portion 9 includes the taper gap and contacts with the thrust bearing portion TB2. The lubrication agent filled in the thrust bearing portion TB2 is also filled in the taper seal portion 9. The lubrication agent filled in the taper seal portion 9 is held in the taper seal portion 9 due to capillary attraction.

The inner body 8 also has one end surface 8$f$ which abuts to a bottom surface 6Bf of the disc portion 6B and the other end surface (a protrusion portion 8B) which protrudes from the annular wall portion 6A. The field magnet 10 is fixed to an outer circumference surface of the protrusion portion 8B.

The armature 13 is disposed on the motor base 1. The armature 13 includes a core 11 having a salient pole 11A which is opposed to the field magnet 10 at a distance and a coil 12 wound around the core 11.

The rotor hub 6 is made of a non-magnetic material (e.g. austenite stainless). The inner body 8 is made of a magnetic material (e.g. ferrite stainless). Therefore, magnetic fluxes of the field magnetic 10 are attracted toward an inner body 8 side and a core 11 side and are hardly introduced toward a rotor hub 6 side. This increases drive torque of the rotor.

The magnetic shield 14 is disposed above the armature 13 and covers the armature 13. The magnetic shield 14 prevents magnetic fluxes from leaking from the armature 13 to a maximum extent. When the disc 7 is a magnetic recording disc, the magnetic fluxes leaking from the armature 13 have harmful influences to the magnetic recording disc. In this case, the rotor hub 6 is made of a magnetic material, which prevents the magnetic fluxes from leaking from the armature 13.

Figure 3:
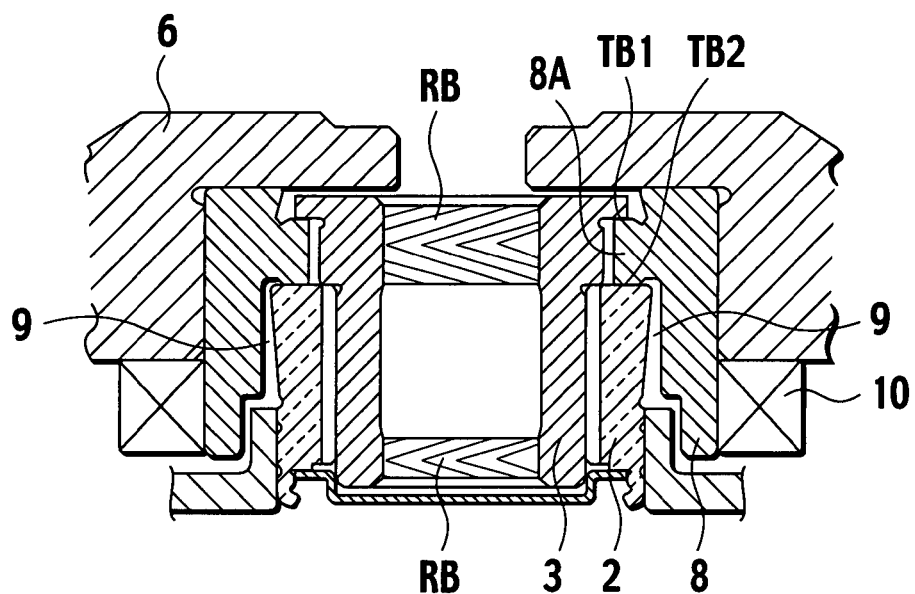
FIG. 3 is a partly enlarged cross-sectional view of the motor according to the first exemplary embodiment of the present invention.

As shown in FIG. 3, two herringbone type grooves are formed on upper and lower portions of the inner circumference surface of the sleeve 3, respectively. Two radial bearing portions RB and RB in a dynamic pressure type include the two herringbone type grooves, respectively. This can increase the pressure of lubrication agent filled in a gap between the sleeve 3 and the rotor spindle 5, due to these herringbone type grooves of the radial bearing portions RB and RB, when the rotor spindle 5 inserted into the sleeve 3 rotates. The increased pressure (dynamic pressure of the lubrication agent) can support radial load acting to the rotor spindle 5.

Next, an assembling method of the motor M will be described.

First, the sleeve 3 is inserted into the inner body 8. Next, the sleeve holder 2 is inserted between the sleeve 3 and the inner body 8, which allows the sleeve 3 to be loosely fitted in the sleeve holder 2. Thus, the sleeve holder 2, the sleeve 3 and the inner body 8 form a bearing unit.

Then, the bearing unit is incorporated into the rotor hub 6. More specifically, by acting pressing force toward the inner body 8 along the axial direction of the inner body 8, the bearing unit is pressure-inserted into the rotor hub 6 until the one end surface 8$f$ abuts to the bottom surface 6Bf of the disc portion 6B of the rotor hub 6. This prevents the pressing force from directly acting the thrust bearing portions TB1 and TB2. Therefore, the thrust bearing portions TB1 and TB2 are not damaged or crushed at a time of assembling the motor M. As a result, distances of gaps included in the thrust bearing portions TB1 and TB2 are kept constant. Next, the lubrication agent is filled in gaps included in the bearing unit. Finally, the sleeve holder 2 is fixed to the motor base 1 and then the rotor spindle 5 is inserted into the sleeve 3. It is noted that the insertion of the rotor spindle 5 may be carried out before the bearing unit is incorporated into the rotor hub 6.

Figure 4:
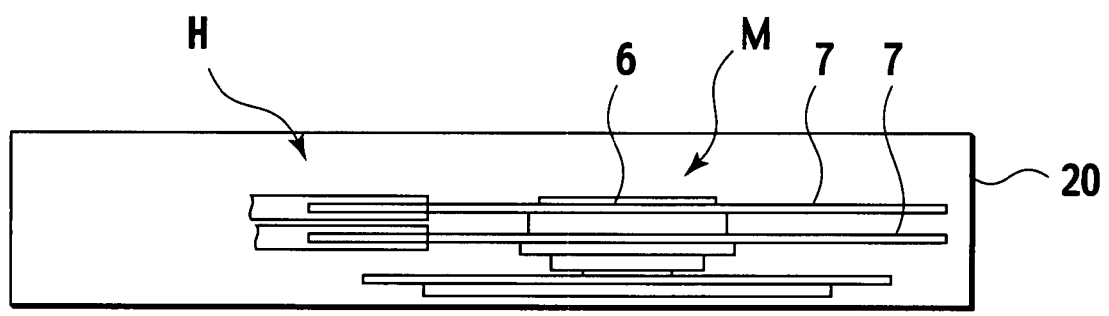
FIG. 4 is a cross-sectional view of a disc drive with the motor according to the first exemplary embodiment of the present invention.

As shown in FIG. 4, the motor M is built into a housing 20 together with a magnetic head H which adapted to approach the disc 7. Although the disc drive shown in FIG. 4 is a HDD (hard disc drive) configured to rotate a hard disc as the disc 7 by the motor M, it may be a disc drive configured to rotate an optical disc such as a CD or a DVD as the disc 7. In this case, an optical pick-up instead of the magnetic head H is built into the housing 20.

Also, although the rotor spindle 5 is a member which is separated from the rotor hub 6 in this embodiment, it may be integrally formed with the rotor hub 6.

Second Exemplary Embodiment

Figure 5:
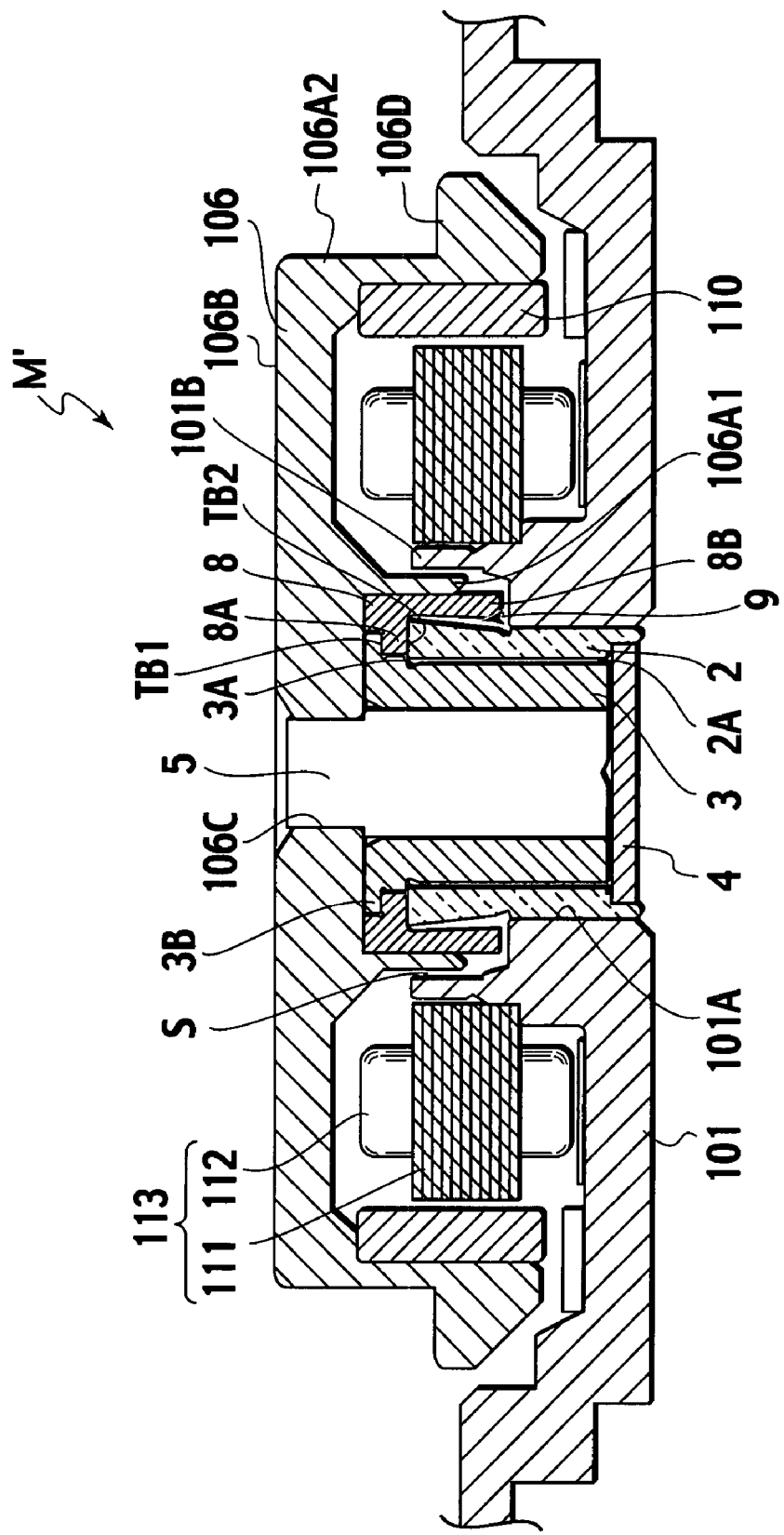
FIG. 5 is a cross-sectional view of a motor according to a second exemplary embodiment of the present invention.

A motor (electric motor) according to a second exemplary embodiment of the present invention will be described below in detail, with reference to FIG. 5.

A motor M' according to the second exemplary embodiment is an outer rotor type motor. In contrast, the motor M according to the first exemplary embodiment is an inner rotor type motor. As shown in FIG. 5, the motor M comprises a motor base 101, the sleeve holder 2, the sleeve 3, the seal plate 4, the rotor spindle 5, a rotor hub 106, the inner body 8, the taper seal portion 9, a field magnet 110 and an armature 113. It is noted that the sleeve holder 2, the sleeve 3, the seal plate 4, the rotor spindle 5, the inner body 8 and the taper seal portion 9 are the same as those of the motor M.

The motor base 101 forms a stator and has a center hole 101A at a center portion thereof. The motor based 101 is formed by a die-cast molding etc. The sleeve holder 2 is fixed into the center hole 101A with an adhesive material. The sleeve 3 is pressure-inserted into the inner hole of the sleeve holder 2 or fixed into the inner hole of the sleeve holder 2 with an adhesive material, to be fixedly held by the sleeve holder 2.

The seal plate 4 is fixed to one end of the sleeve holder 2. Thereby, one opening of the sleeve holder 2 is fully closed by the seal plate 4. The sleeve 3 has the step portion 3A at the upper portion of the outer circumference portion thereof The step portion 3A is employed to position the sleeve 3 with respect to the sleeve holder 2. The step portion 3A is firmly attached to the other end of the sleeve holder 2.

The oil passage 2A is formed between the sleeve holder 2 and the sleeve 3. The oil passage 2A extends along axial directions of the sleeve holder 2 and the sleeve 3. A lubrication agent (lubrication oil) is poured into the oil passage 2A, which causes the lubrication agent to be filled between the inner circumference portion of the sleeve holder 2 and the lower portion of the outer circumference portion of the sleeve 3. The sleeve 3 has the flange portion 3B at the top portion of the outer circumference portion thereof. The flange portion 3B extends outward from the top portion. The bottom surface of the flange portion 3B is opposed to the upper surface of the annular rim of the other opening of the inner hole of the sleeve holder 2 at a distance.

The rotor spindle 5 is inserted into the inner hole of the sleeve 3 to be rotatably supported by the sleeve 3. The rotor hub 106 is fixed to the top portion of the rotor spindle 5 to be rotated together with the rotor spindle 5.

The rotor hub 106 has a double cup-like shape, and includes an inside annular wall portion 106A1, an outside annular wall portion 106A2 and a disc portion 106B. The outside annular wall portion 106A2 has a vamplate 106D at an outer circumference portion of one end thereof. The vamplate 106D extends outside from the outer circumference portion. The inside annular wall portion 106A1 has the same central axis as the rotor spindle 5. The outside annular wall portion 106A2 has the same central axis as the rotor spindle 5. The disc portion 106B is integrally connected to the other end of the inside annular wall portion 106A1 at a middle portion thereof the other end of the outside annular wall portion 106A2 at an outer circumference portion thereof. The disc portion 106B has a coupling hole 106C at a center portion thereof. The rotor spindle 5 is inserted into the inner hole of the sleeve 3 through the coupling hole 106C. The rotor hub 106 is inserted into a center hole of a disc (e.g. a hard disc, not shown), which holds the disc on the vamplate 106D of the rotor hub 106.

The inner body 8 is disposed between the sleeve holder 2 and the inside annular wall portion 106A1 and between the sleeve 3 and the inside annular wall portion 106A1. More specifically, the inner body 8 is fixed to an inner circumference portion of the inside annular wall portion 106A1 and is loosely fitted to the sleeve holder 2 and the sleeve 3. The inner body 8 has the annular protrusion portion 8A at an inner circumference portion thereof. The annular protrusion portion 8A extends intrad from the inner circumference portion and is sandwiched between the bottom surface of the flange portion 3B of the sleeve 3 and the upper surface of the annular rim of the sleeve holder 2. The lubrication agent poured into the oil passage 2A is filled in two bearing gaps between the annular protrusion portion 8A and the sleeve holder 2 and between the annular protrusion portion 8A and the flange portion 3B. The thrust bearing portions TB1 and TB2 in a dynamic pressure type have the two bearing gaps, respectively.

The inner body 8 also has the protrusion portion 8B which protrudes from the inside annular wall portion 106A1. The field magnetic 110 is fixed to an inner circumference surface of the outside annular wall portion 106A2.

The motor base 101 also has an annular protrusion portion 101B. An inner circumference surface of the annular protrusion portion 101B is opposed to an outer circumference surface of the inside annular wall portion 106A1 of the rotor hub 106 at a distance. A narrow space S is defined between the annular protrusion portion 101B and the inside annular wall portion 106A1. Even if the lubrication agent leaks from the taper seal portion 9, the narrow space S keeps the leaking lubrication agent to prevent it from spreading outside the annular protrusion portion 101B. This prevents the lubrication agent from reaching the disc set in the rotor hub 106.

The armature 113 is disposed between the field magnetic 110 and the annular protrusion portion 101B. The armature 113 includes a core 111 and a coil 112 wound around the core 111. The core 111 is opposed to the field magnetic 110 and the annular protrusion portion 101B at a certain distance.

The rotor hub 106 is made of a magnetic material (e.g. ferrite stainless). Therefore, magnetic fluxes of the field magnetic 110 are attracted toward the rotor hub 106.

The field magnetic 110 and the coil 112, which are members for generating magnetic fluxes, and the core 111, which is a member through which the generated magnetic fluxes pass, are disposed inside the rotor hub 106. Therefore, the magnetic fluxes are prevented from leaking outside the rotor hub 106, without providing in the motor M' a shield member which is separated from the rotor hub 106. As a result, when the motor M' is mounted in a hard disk drive, this prevents the magnetic fluxes from affecting a hard disk or a magnetic head in the hard disk drive. Also, the inner body 8 may be made of a non-magnetic material because it needs no prevention of leakage of magnetic fluxes. Therefore, the inner body 8 may be made of a free-cutting steel having high cutting performance.

The sleeve holder 2, the sleeve 3, the seal plate 4, the rotor spindle 5, the inner body 8, the taper seal portion 9, the thrust bearing portions TB1 and TB2 and the radial bearing portions RB and RB of the motor M' have the same technical effects as those of the motor M.

What is claimed is:

1. A motor comprising:
a sleeve having a flange portion on an outer circumference portion thereof and configured to rotatably support a rotor spindle;
a sleeve holder configured to hold the sleeve;
a rotor hub having an annular wall portion which has the same center axis as the rotor spindle and configured to rotate together with the rotor spindle;
an inner body fixed in an inside of the annular wall portion so as to surround the sleeve and the sleeve holder, wherein the inner body has an annular protrusion portion which is sandwiched between the flange portion and one end portion of the sleeve holder, on an inner circumference portion thereof;
a first thrust bearing portion formed between the annular protrusion portion and the flange portion, the first thrust bearing portion having a first groove, which is formed on a surface of the annular protrusion portion and the flange portion opposed to each other in an axial direction of the motor, for increasing the pressure of lubricant agent filled in the first thrust bearing portion, and supporting thrust loads using the first groove; and
a second thrust bearing portion formed between the annular protrusion portion and the one end portion of the sleeve holder, the second thrust bearing portion having a second groove, which is formed on another surface of the annular protrusion portion and the end portion of the sleeve holder opposed to each other in the axial direction of the motor, for increasing the pressure of lubricant agent filled in the second thrust bearing portion, and supporting thrust loads using the second groove.

2. The motor according to claim 1, wherein the inner body has a first end portion which abuts to an inner surface of the rotor hub and a second end portion which protrudes from the annular wall portion and is held by a whole inner circumference of the annular wall portion of the rotor hub.

3. The motor according to claim 2, wherein the inner body and the rotor hub are made of a magnetic material and a non-magnetic material, respectively, and
a field magnet is fixed to an outer circumference surface of the second end portion.

4. The motor according to claim 1, wherein the rotor hub has a second annular wall portion outside the annular wall portion and a field magnet is fixed to an inner circumference surface of the second annular wall portion.

5. The motor according to claim 4, wherein the inner body and the rotor hub are made of a non-magnetic material and a magnetic material, respectively.

6. A disc drive comprising:
a housing; and
a motor built into the housing,
wherein the motor comprising:
a sleeve having a flange portion on an outer circumference portion thereof and configured to rotatably support a rotor spindle;
a sleeve holder configured to hold the sleeve;
a rotor hub having an annular wall portion which has the same center axis as the rotor spindle and configured to rotate together with the rotor spindle;
an inner body fixed in an inside of the annular wall portion so as to surround the sleeve and the sleeve holder, wherein the inner body has an annular protrusion portion which is sandwiched between the flange portion and one end portion of the sleeve holder, on an inner circumference portion thereof;
a first thrust bearing portion formed between the annular protrusion portion and the flange portion, the first thrust bearing portion having a first groove, which is formed on a surface of the annular protrusion portion and the flange portion opposed to each other in an axial direction of the motor, for increasing the pressure of lubricant agent filled in the first thrust bearing portion, and supporting thrust loads using the first groove; and
a second thrust bearing portion formed between the annular protrusion portion and the one end portion of the sleeve holder, the second thrust bearing portion having a second groove, which is formed on another surface of the annular protrusion portion and the end portion of the sleeve holder opposed to each other in the axial direction of the motor, for increasing the pressure of lubricant agent filled in the second thrust bearing portion, and supporting thrust loads using the second groove.

7. The motor according to claim 1, further comprising:
a taper seal portion formed between the inner body and the sleeve holder to hold the lubricant agent.

* * * * *